Feb. 17, 1948. S. KRASNOW ET AL 2,436,008
SIGNALLING SYSTEM FOR RADIOACTIVE WELL LOGGING
Original Filed Oct. 24, 1939 7 Sheets-Sheet 1
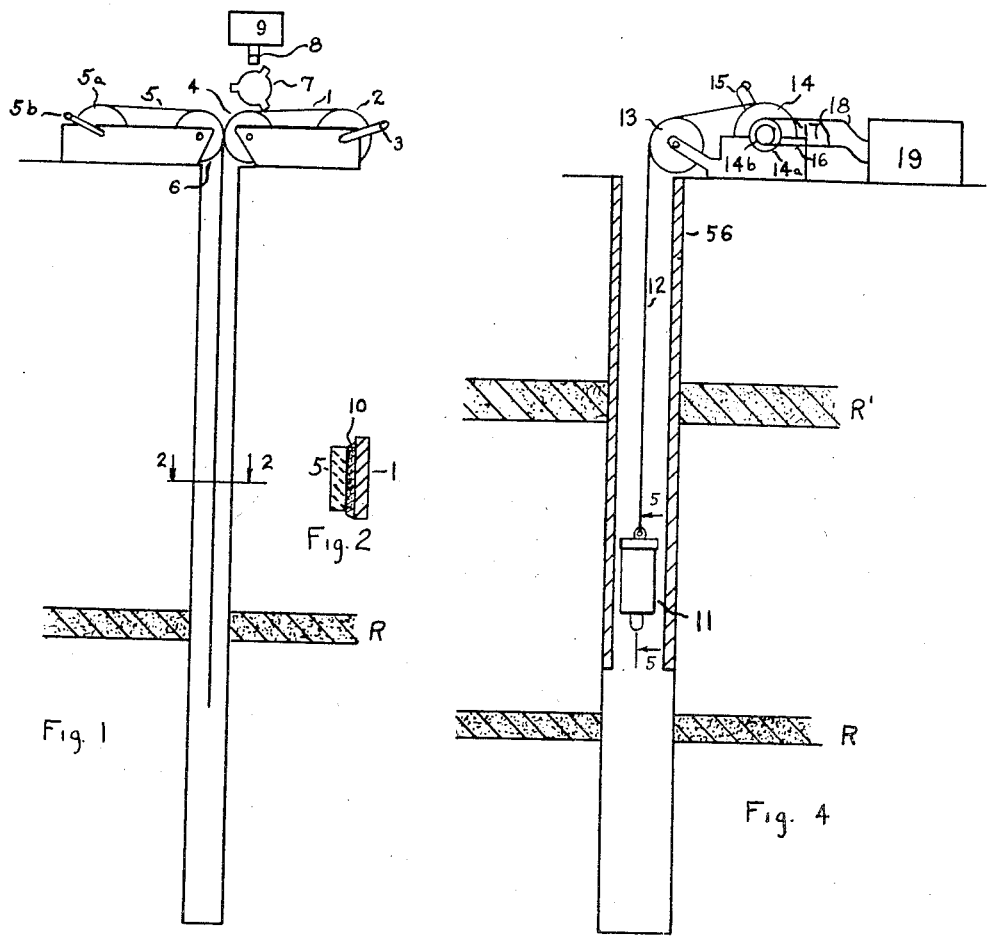
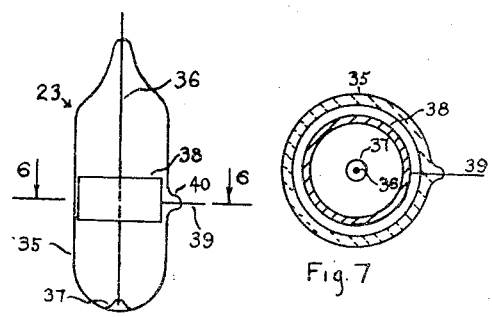
INVENTORS
SHELLEY KRASNOW
LEON F. CURTISS
ATTORNEY

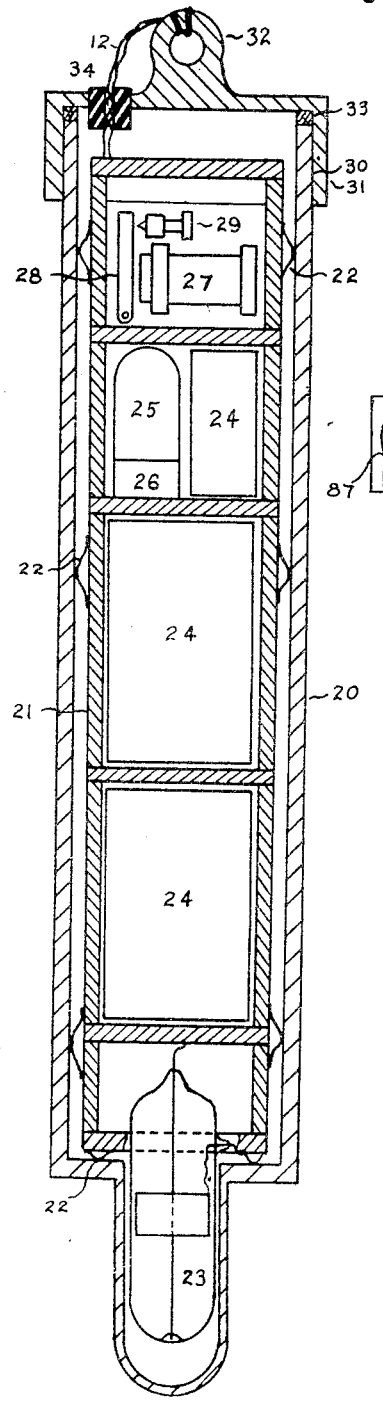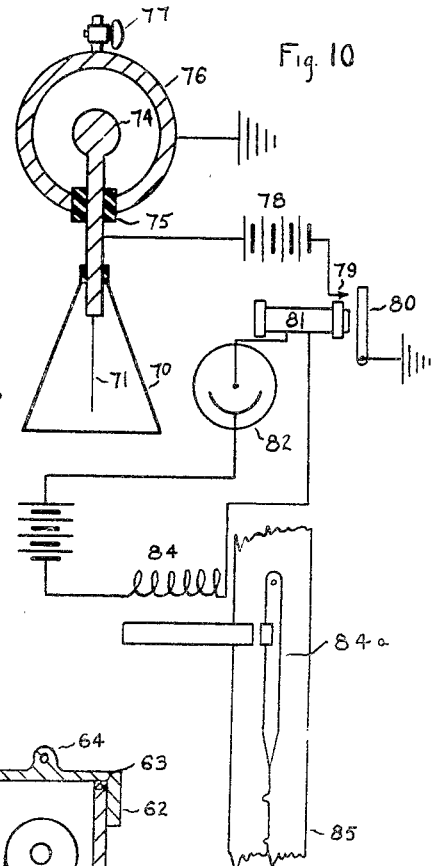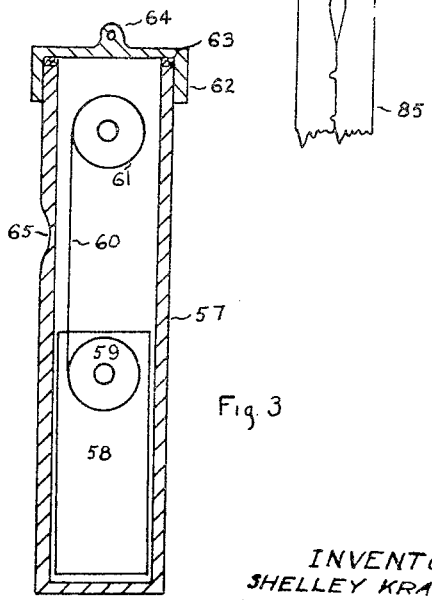

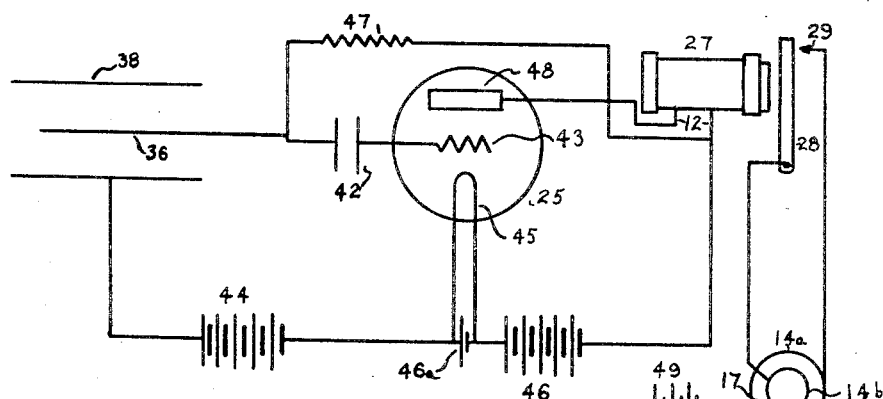
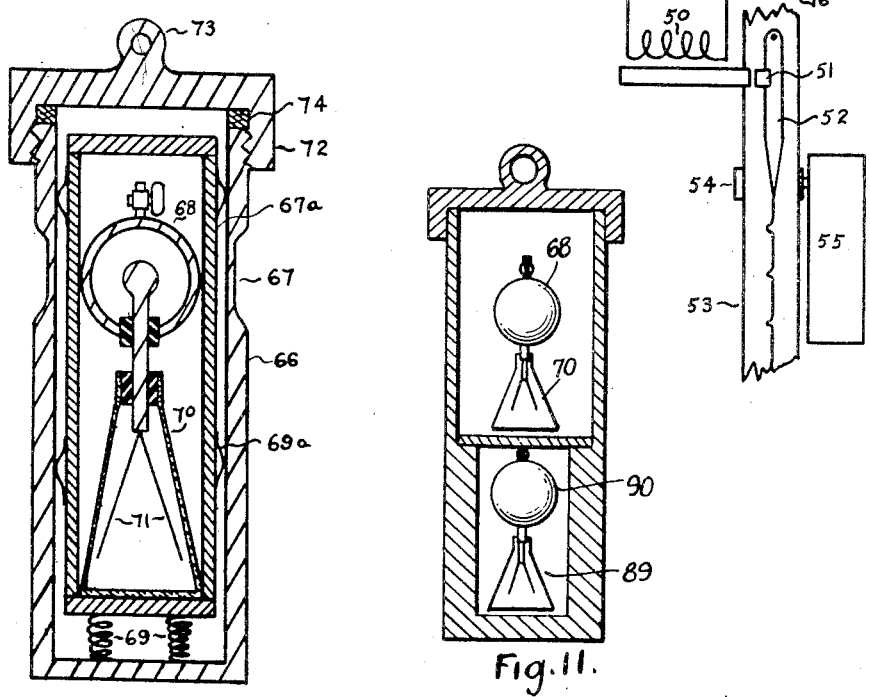

INVENTORS
SHELLEY KRASNOW,
LEON F. CURTISS,

Shelley Krasnow

ATTORNEY

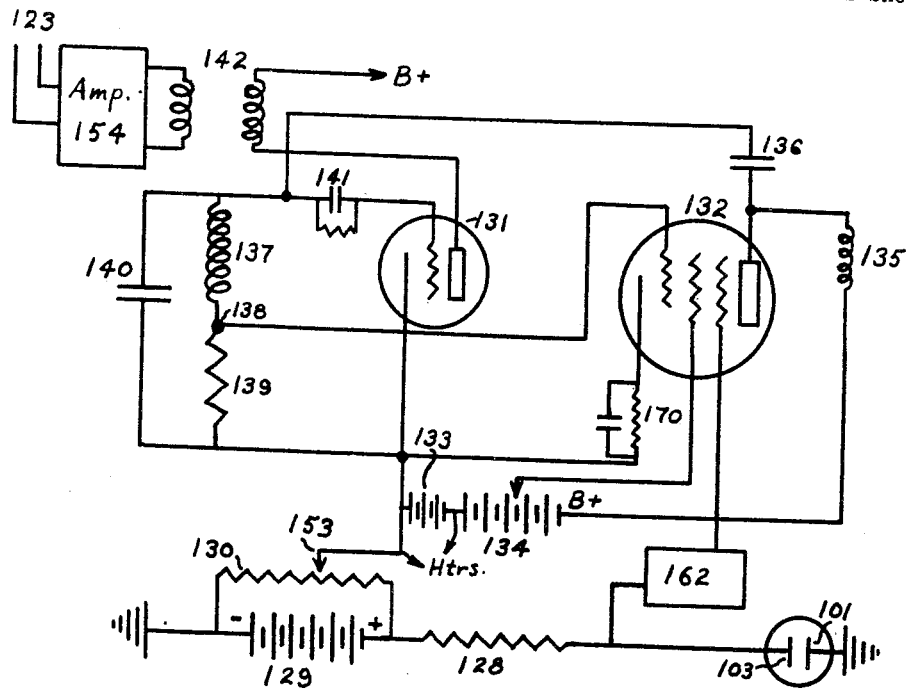
Fig. 19
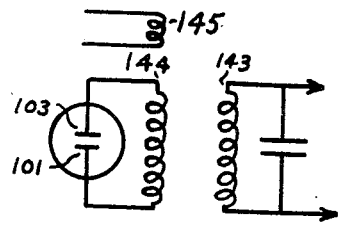
Fig. 22
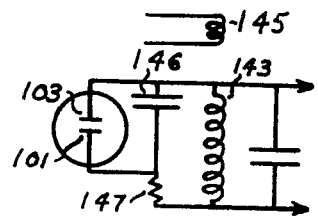
Fig. 23
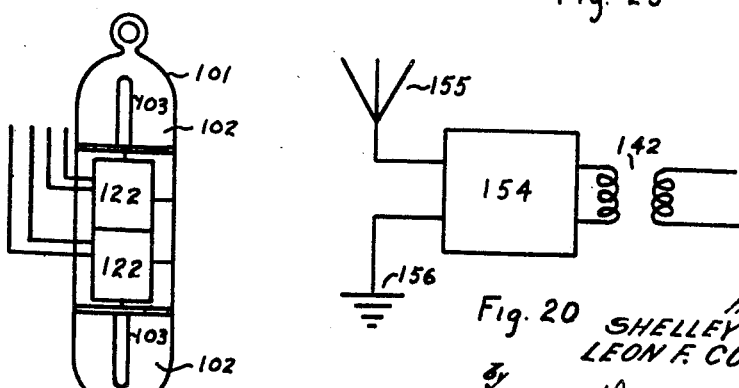
Fig. 26
Fig. 20
INVENTORS
SHELLEY KRASNOW,
LEON F. CURTISS,
ATTORNEY

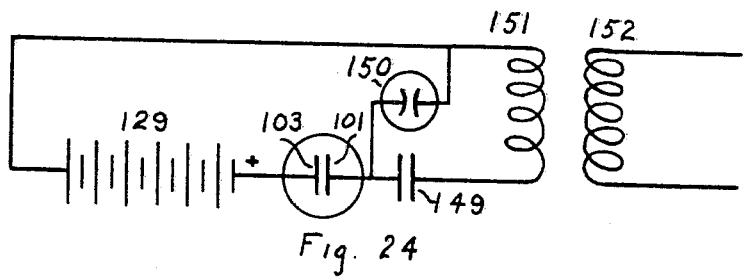
Fig. 24
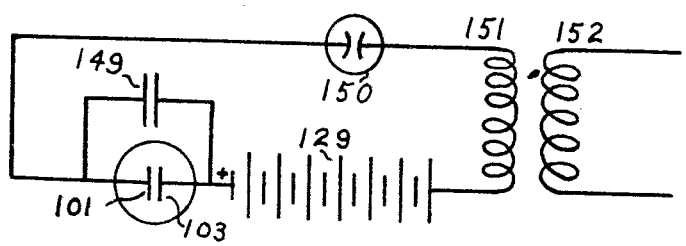
Fig. 25
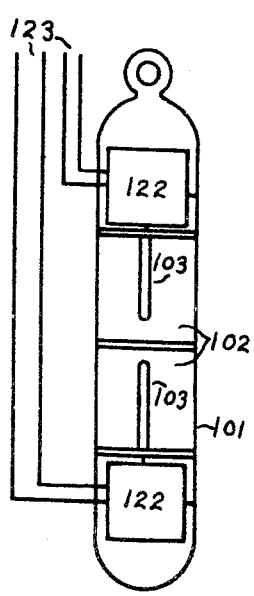
Fig. 27
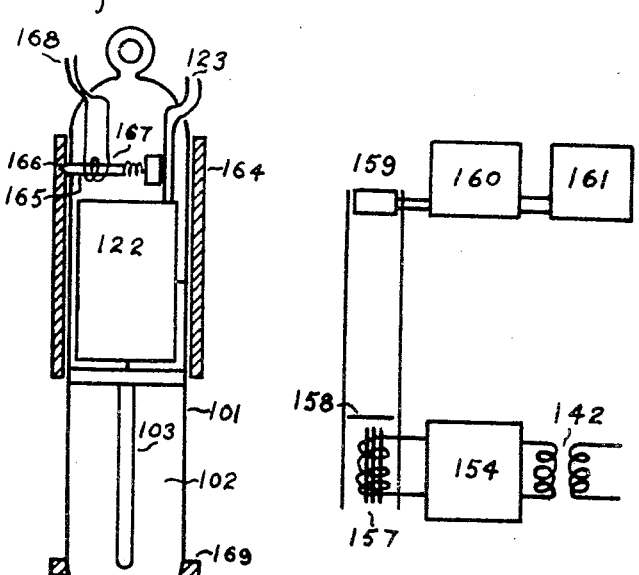
Fig. 28
Fig. 21

Patented Feb. 17, 1948

2,436,008

UNITED STATES PATENT OFFICE 2,436,008

SIGNALLING SYSTEM FOR RADIOACTIVE WELL LOGGING

Shelley Krasnow, Arlington, Va., and Leon F. Curtiss, Montgomery County, Md.

Original application October 24, 1939, Serial No. 301,078. Divided and this application January 19, 1943, Serial No. 472,894

16 Claims. (Cl. 250—83.6)

1

This invention relates to an improved method and apparatus for measuring radioactivity, and has particular reference to a method and apparatus for measuring radioactivity in inaccessible locations, such as in boreholes or at considerable depths in bodies of water.

One object of the invention is to provide a method and apparatus useful for locating deposits of minerals having radioactive properties. Another object of the invention is to provide an apparatus by which one may measure radioactive properties continuously from the top to the bottom of a borehole, and have both an immediate indication, and a permanent record, of the radioactivity at various depths.

In locating deposits of radioactive minerals it is often the custom to drill a number of boreholes in localities where such deposits might exist. It is further the practice to bring samples or cores of the drilled material to the surface of the earth, and there examine them for radioactivity by well known methods and apparatus. This method has several drawbacks. First, a deposit of ore may exist close to the borehole, but not be traversed by it, by which the deposit will be missed. Second, it is possible to make an error in ascertaining the exact depth from which a core or sample has been taken. Finally, it is rarely possible to bring all of the core to the surface, a certain percentage always being lost in the drilling or handling.

It is further known that deposits of petroleum are often markedly radioactive as compared with the surrounding rock material. This is believed to be due to the superior absorptive property of petroleum for radium emanation. Natural gas and ground water are also known to be somewhat more radioactive than their surrounding rock material. In drilling for either petroleum or natural gas, or ground water, it is desirable to know the exact level at which the strata having these are traversed by the drilled hole. This is often difficult to determine, particularly when drilling has been done by the "rotary" method, in which the use of mud under pressure tends to wall off the strata. Often too, the drilled hole will be lined with a metallic casing, which casing by accident or intention may seal off strata having the desired fluid.

It is the intention in the present invention to provide an apparatus so sensitive, and a method appropriate to its use, that the relatively faint radioactivity of oil and ground water may be detected in place in a borehole. An apparatus sensitive enough to serve this function will by

2 its nature differentiate between the different though faint radioactivities of the rock material. Rock materials, dependent upon their origin and dependent upon the minerals contained in them, have different radioactivities. Thus, it has been found that granite, shales having organic materials embodied therein, sedimentary rocks containing zircon, and rock materials having mica associated with them, are all slightly more radioactive than for example limestone or chalk deposits. Sandstones will differ in their natural radioactivity, depending upon the minerals contaminating them. Organic deposits, such as coal, oil and natural gas, as mentioned above, petrified vegetable matter, etc., will show higher radioactivities than for instance limestone and chalk. Thus, with an apparatus as sensitive as that described herein it will be possible to differentiate between different layers of rock by the differences in their radioactivities. Each layer in an area will have a characteristic radioactivity, just as it has a characteristic chemical composition, and for the same reason. Thus, the radioactivity of a layer will serve as a variety of marker, serving to identify the layer wherever it might be in an area.

It thus becomes possible to identify rock layers in different boreholes drilled in an area and thus correlate the strata.

Further objects of the invention described are to obviate the difficulties mentioned and secure the advantages mentioned above.

Reference is had to the accompanying drawings in which:

Figure 1 represents a simplified form of apparatus for giving a continuous photographic record of radioactivity at various depths.

Figure 2 shows a cross section of the members used in Figure 1, taken across the plane 2—2.

Figure 3 shows a vertical cross-sectional view of another type of apparatus adapted to giving a photographic record of radioactivity.

Figure 4 shows a more convenient form of apparatus for measuring radioactivity at various depths in a borehole.

Figure 5 shows a cross-sectional view of the element 11 shown in Figure 4, taken across the plane 5—5.

Figure 6 shows the sensitive element employed in the apparatus shown in Figure 5.

Figure 7 shows a cross section of the element in Figure 6 taken across the plane 6—6.

Figure 8 shows the circuit diagram of the apparatus shown in Figure 4.

Figure 9 shows a vertical cross-sectional view of still a further type of apparatus which may be used for the purpose described.

Figure 10 shows the circuit diagram for an improved apparatus constructed along the lines of that shown in Figure 9.

Figure 11 shows essentially the same apparatus as is shown in Figure 9 with the addition of another electroscope to serve as a control.

Figure 19 shows the electrical circuit suitable for use in the modification shown in Figure 15.

Figure 20 shows a modification of Figure 19 for radio transmission to the surface of the ground.

Figure 21 shows schematically a system for conveying information to the surface of the ground by means of mechanical waves.

Figure 22 shows a circuit for causing a change in frequency with change of radioactive intensity.

Figure 23 shows still another circuit serving the same function as that shown in Figure 22.

Figure 24 shows still another circuit, utilizing a glow discharge lamp, and serving to vary the generated frequency in relation to the change in radioactive intensity.

Figure 25 shows a modification of the circuit shown in Figure 24.

Figure 26 shows an apparatus for measuring radioactive gradient.

Figure 27 shows a modification of the apparatus indicated in Figure 26 to render measurements of radioactivity more dependable.

Figure 28 shows an apparatus for measuring radioactive intensity with the interposition of a filter.

Figure 12:
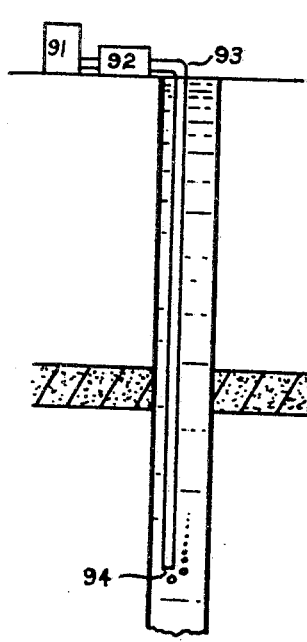
Figure 12 shows a means of rendering strata artificially radioactive.

Referring now particularly to Figure 1, I shows a flexible band, preferably metallic, wound upon a reel 2 operated by a crank 3. The band passes over a measuring wheel 4 and into the borehole. A photographic film 5 is fed from a reel 5a operated by a crank 5b. A lobed member 7 serves to apply cement to the band 1 at regular intervals. This cement is fed by a brush 8 from tank 9.

In operation the band 1 and photographic film 5 are reeled together down into the borehole. Because of the limited strength of the photographic film, it is found desirable to cement the latter to the band 1 at intervals and thus relieve it of tensile stress. As the film 5 and band 1 are reeled out together, the member 7 applies spots of cement 10 at intervals throughout the length of the band 1. This serves to cement the film and band together at intervals. The cement used may be of such nature that it will allow the ready separation of the two members when they are removed from the borehole. The photographic film reeled out is left in the borehole for a considerable period, which may be as much as several days. It is then wound upon the reel, removed and developed. If a markedly radio-active layer such as R exists, the film will be found to show a light spot. By measuring the length of film to this spot, the depth of the layer R may be determined. A film reinforced with strands of fiber or metal may be used and thus the necessity of using the band 1 obviated. It is further evident that the film may be coated with any of the standard intensifying materials commonly used in preparing medical X-ray films. The film may also be coated with a substance to render it impervious to any harmful liquids which may exist in the borehole. An opaque coating may be applied to the film to allow its use in daylight. If the coating is properly chosen, it will not materially hinder the passage of rays from radioactive material.

In the modification shown in vertical cross-section in Figure 3, a cartridge 57 is provided. In this is mounted a clock driven motor 58 which serves to wind photographic film 60 upon spool 59, the film originally being on spool 61. Cover 62 is removably fastened to container 57 by means of any suitable connection, preferably a threaded connection. A gasket 63 serves to make a fluid tight seal. The ring 64 serves for lowering and raising the apparatus in the borehole. The cartridge 57 is made of suitably heavy material to prevent collapse thereof under the high fluid pressure which may exist in a liquid-filled borehole. However, in order to reduce the absorption of radiation by the cartridge a thinned portion 65 is provided. Since this is of small area the material here may be made quite thin. In operation the clockwork 58 would be so set as to maintain the film 60 at a fixed position for a predetermined time, after which it would advance the film so as to expose a new portion thereof, and would serve to expose this new portion again for a predetermined period. The operator, knowing the length of these periods would maintain the cartridge at a fixed depth for each such period. Because of the slowness with which the film would be affected, it would not be necessary in most cases to provide any shield to protect the film from exposure while the apparatus is being raised and lowered.

A more convenient form of the apparatus shown in Figure 8 employs a cartridge 11 suspended in the borehole by a conducting cable 12. The cable 12 passes over a measuring wheel 13 and thence onto a reel 14 operated by a crank 15. A pair of slip-rings 14a and 14b fastened to the shaft of the reel 14 have bearing upon them the brushes 16 and 17. These brushes are connected through the medium of wires 18, 18, to a recording element 19. Referring now to Figures 5 and 6, the cartridge 11 consists essentially of a radio-active-sensitive member 23 mounted at the bottom of a pressure-tight cartridge 20. A rack 21 holds the element 23 and serves further to hold batteries 24, vacuum tube 25, and relay 27. Springs 22 serve to prevent violent contact of the frame 21 with cartridge 20. A cap 31 is fastened by means of a threaded or other connection 30 onto one end of cartridge 20. A fluid tight seal is had by the use of gasket 33. The wires necessary to convey the signals from the cartridge 11 pass through insulating bushing 34 and are looped onto ring 32 and thence pass to the surface. In this way the wire serves also for raising and lowering member 11.

The sensitive element 23 consists essentially of a sealed glass vessel 35 which has within it a conducting ring 38 connected to wire 39 passing through seal 40. Through the axis of ring 38 there passes another conducting member 36, in the form of a wire or filament. This member 36 passes through seal 41 and is further anchored against mechanical movement by being fastened to the bottom of the vessel at 37. Container 35 is filled with any desired gas such as air, at a pressure which may be as little as a few centimeters of mercury or as much as atmospheric, and is then sealed off, after which it may be used for long periods of time without further attention. In operation the members 36 and 38 are kept at a high potential relative to each other by means of batteries 46 and 44 operating through high resistance leak 47, as shown in Figure 8. A suitable value for the voltage of battery 46 is 135 volts; of battery 44, 360 volts. The positive end of battery 44 is connected to one side of the filament 45 of vacuum tube 25. The member 36 is connected to a blocking condenser 42 and thence to the grid 43 of the same vacuum tube. The plate 48 of this tube is connected through relay 27 to the positive end of battery 46. The relay 27, when de-energized, serves to close contacts 28 and 29, thus allowing a current to flow through wires 12, slip-rings 14a and 14b, brushes 16 and 17, electro-magnet 50 and battery 49. This battery serves as a source of electrical energy connected to the cable composed of leads going from contacts 28 and 29 to the surface of the earth. As is seen from the drawing, the cable is a two conductor type having the source of electrical energy connected thereto at the surface of the earth. Figure 5 further shows the two conductors at the top thereof, identified as element 12. The electro-magnet 50 serves to attract armature 51 which further serves to move pen 52 across the tape 53 kept in constant uniform motion by means of drum 54 operated by driving means 55.

The operation of the apparatus is as follows: The members 36 and 38 are charged at a controlled rate to a high potential relative to each other by means of the batteries 46 and 44 operating through leak 47. In the presence of radioactive material the gas in the container 35 will be partially ionized and will thus change the potential of the member 36. This will result in a change of potential of the grid 43 which will reduce the current normally flowing between filament 45 and plate 48 of vacuum tube 25. This will in turn reduce the current in relay 27 sufficiently to allow its armature 28 to be retracted, closing the circuit between member 28 and contact 29. The closing of this circuit will cause a current to flow through slip-ring 14b, brush 17, battery 49, electro-magnet 50, brush 16, and slip-ring 14a. The energizing of electro-magnet 50 will cause armature 51 to move pen 52, causing a break in the line traced on tape 53. It will be noted that upon each closure of the contacts 28 and 29, the energy conducted downward by the cable is controlled by the said contacts to create within the cable a pulsating signal, the frequency of which is proportionate to the radioactivity. This pulsating signal is then communicated by the cable to the surface of the earth where it makes itself manifest by a break or kink in the line traced by the pen 52. It will be further noted that the operation of the apparatus results in the formation of a varying electric current having a predetermined repetitive character. Thus the cycle of operation is repeated, with a frequency of repetition proportionate to the radioactivity sensed by the detecting element. By the operation of relay contacts 28 and 29, there is created within the cable a series of electric pulses whose frequency characteristics are determined by and related to the frequency of operation of the Geiger-Muller tube 36—38. This latter frequency is in turn determined by the radioactivity, as pointed out herein.

Upon the operation of the circuit in this fashion, the potential of member 36 will be restored to its original value, increasing the filament-to-plate current in tube 25, energizing relay 27 and thereby causing the circuit made by members 28 and 29 to open.

Upon the further ionization of the gas in container 35 the operation above described will be repeated. Thus the frequency of the pulses finally received by pen 52 will be a measure of the radioactivity of the material in the vicinity of member 23. It will be noted that the rays given off by radioactive substances have considerable penetrating power and can therefore easily penetrate the shield 20 even if the latter be made of metal. To reduce the absorption of these rays by the metal, however, that portion of the cartridge 20 which houses the member 23 is provided with thinner walls than the remainder; a construction made possible by the smaller diameter of the said portion. It will be noted further that even if a metallic casing such as 56 exists in the borehole the presence of a radioactive layer such as R' may be noted because of the easy penetration of the rays through the thickness of metal ordinarily employed for casing.

Another type of apparatus which may be employed is shown in vertical cross section in Figure 9. In this, cartridge 66 is provided with a threaded cap 72 sealed by gasket 74 and raised and lowered by ring 73. Within the cartridge 66 is a frame 67a which holds an ionization chamber 68 connected to an electroscope 70, which may be of any suitable type, but which is shown schematically as a gold leaf electroscope employing leaves 71. Springs 69 serve to cushion the shocks imparted to the frame 67a. A circumferential thin portion 67 of the cartridge is provided to reduce the absorption of the rays in passing to the chamber 68. In use the electroscope is charged to a high potential relative to the outer walls of the ionization chamber 68. It is then mounted on frame 67a, inserted in cartridge 66, the latter sealed with cap 72, and the whole lowered into the well. The apparatus is allowed to remain at a depth where presence of radioactive material is suspected, for a suitable length of time. It is then raised and the alteration in charge on the electroscope noted. A second electroscope similar to electroscope 70 may be mounted in the cartridge 66 and shielded from radiation, to serve as a control. Thus, the cartridge 66 may be made longer and an electroscope and ionization chamber, entirely shielded with lead, mounted above the chamber 68. This arrangement is shown in Figure 11, the control electroscope and ionization chamber being designated respectively as 89 and 90.

A somewhat more elaborate arrangement than is shown in Figure 9 is that shown schematically in Figure 10. In this, means are provided to charge the electroscope periodically on its charge falling off by a definite amount. The frequency with which the electroscope is charged is a measure of the ionization current flowing and thus of the intensity of radiation in the vicinity. Specifically, the apparatus consists of an ionization chamber having an outer conducting wall 76 into which is fastened to a stopcock 77 through which a suitable gas, such as air, may be passed into the chamber. An electrode 74 passes through an insulator 75 and thence into the electroscope 70. A lamp 87, surrounded by a light tight housing 86, and having a focusing lens 88, casts a beam of light on photo-cell 82. This beam will fall on the photo-cell 82 only if the leaf 71 is in the discharged position. In such event a current passes through cell 82, relay 81, electromagnet 84, and energizing battery 83. The operation of the relay 81 closes contacts 79 and 80, thus causing battery 78 to recharge the electrode 74, and thus leaf 71. Whenever this event occurs, pen 84a is caused to move across chronograph tape 85, and thus produce a kink in the line traced by the pen. The frequency of these kinks is, therefore, a measure of the radioactivity in the vicinity of chamber 76. It will thus be seen that the system composed of the electroscope, lamp, photocell, etc., in operation gives a repetitive pattern of variation of electric current of a characteristic nature and as described, the frequency of recurrence of the characteristically varying current will be in proportion to the radioactivity incident upon the ionization chamber. In this modification, as in the modification shown in Figure 8, the battery 83 at the surface of the earth conducts current downwardly through the cable to the apparatus in the borehole. This current is controlled within the borehole to create electrical pulses in the cable, which pulses finally appear in graphical form by means of the kinks and marks on the tape 85 by the pen 84a. The system in operation creates electrical pulses in its normal mode of operation. These pulses are impressed upon the cable as indicated above. The frequency of repetition of the varying electric current of a predetermined characteristic nature is varied in proportion to the radioactivity.

In the types of apparatus shown in Figure 5 and Figure 10, the chronograph and entire recording system may be clock operated and mounted in the cartridge so that no conducting wires need pass to the surface. As a further alternative the motion of the tape may be made not a function of time, but rather of the position of a measuring wheel such as 13. In the apparatus shown in Figure 10, the elements shown as 83, 84, 84a, and 85, may be mounted at the surface of the ground, similar to the mounting of element 19 in Figure 4; the rest of the apparatus being mounted in a cartridge suitable for lowering to the desired location. Thus, all of the elements shown in Figure 10, with the exception of members 83, 84, 84a, and 85, would be enclosed within a cartridge and lowered into the borehole. These last named elements would be at the surface of the ground as with similar members shown in Figure 4. The battery 83 is thus a source of electrical energy connected to the cable at the surface of the earth. It will be noted that this cable, consisting of two leads— one to photocell 82, the other to relay coil 81, is a two conductor type having the source of electrical energy, the battery 83, connected to the respective conductors at the surface of the earth.

Figure 14:
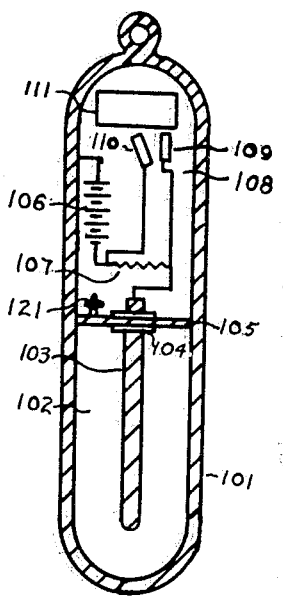
Figure 14 shows still another apparatus for measuring and recording radioactivity at various depths.

Another apparatus which may be used for the same purpose is shown in Figure 14. This consists of a cartridge 101, which is provided with a gas-tight partition 105 and a gas-filled space 102. Located preferably centrally within the space 102 is an electrode 103, carefully insulated by means of amber or other low leakage insulating material 104. In the partition 105 is mounted a valve 121 by which gas may be introduced to attain any desired pressure within the enclosure 102, after which the valve 121 may be shut and the said pressure maintained. The wall 101 is made of strong material, as thin as possible to reduce the absorption of rays of radioactive material passing into the space 102. A material which will combine strength and transparency to rays from radioactive substances is utilized. Suitable materials are: Magnesium alloys, aluminum alloys such as Duralumin, beryllium, or beryllium alloys. A very thin steel housing may be used, the greater strength allowing the material to be so thin that absorption is not serious. The space 102 may be filled with any one of a number of gases. A suitable gas for this purpose is nitrogen, although other gases may be used with almost equally good results.

Above the partition 105 is mounted a high voltage battery 106. Connected to the positive end of battery 106 is a resistor 107, having a high resistance. One terminal of this resistor is connected to the electrode 103, while the negative end of battery 106 is connected to the conducting casing 101.

Figure 16:
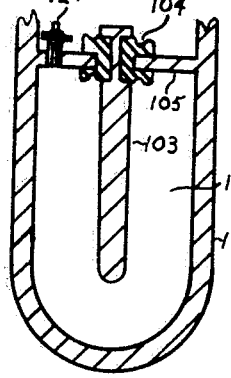
Figure 16 shows a detail of the lower portion of the apparatus shown in Figures 14 and 15.
Figure 17:
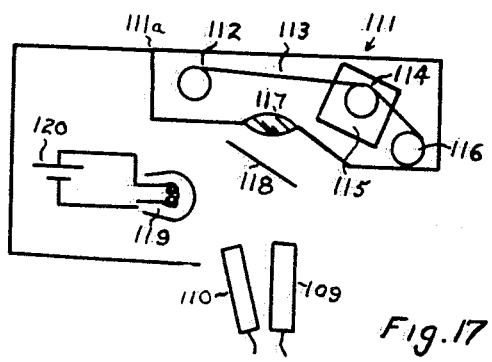
Figure 17 shows a detail of the recording apparatus shown in Figure 14.

Mounted across the ends of resistance 107 is electroscope 108, having a fixed element 109 and a movable element 110. The position of element 110 relative to 109 will depend upon the current flowing through resistance 107, which current will be a measure of the ionization existing between electrode 103 and conducting enclosure 101. The position of element 110 is recorded photographically by a clockwork driven camera 111. The camera is shown more fully in detail in Figure 17. Here an illuminating system and photographic recording system are all mounted within housing 111a. Battery 120 lights lamp 119, throwing light on transparent plate 118. Plate 118 casts light on elements 109 and 110, allowing the elements to be photographed through lens 117 on film 113. A conventional clockwork motor 115 drives spool 114 taking film from spool 116, and allowing it to be reeled upon spool 112. Figure 16 shows the details of the lower portion of the apparatus shown in Figure 14, directing particular attention to the insulation employed. It is of advantage to rib or corrugate the surface of the insulation as shown, to increase the leakage path. Although element 121 is shown as a valve, in practice it may be advantageous to use a standard type of sealed-off glass joint, as employed in the glass blowing art.

The pressure in the ionization chamber is preferably higher than atmospheric so as to give a greater ionization current, as will be familiar to those versed in the art. A pressure of several hundred pounds per square inch will be found suitable. The voltage across the chamber is made as high as possible so as to obtain an increased ionization for a given change in intensity of ionizing rays. The voltage is limited, however, by the fact that if it is made too high, ionization by collision will result and the chamber will support a steady discharge regardless of the intensity of ionizing rays in its vicinity. The value of the resistance is such as to cause an easily measurable voltage drop across its terminals for the usual intensity of ionizing rays. Its value will be chosen with regard to this and with regard to the requirements of the voltage indicating device. Good results may be obtained with a resistance having a value comparable and preferably approximately equal to the effective resistance of the ionization chamber. Suitable values are: a battery voltage of 130, and a resistance value of 10 megohms.

Figure 15:
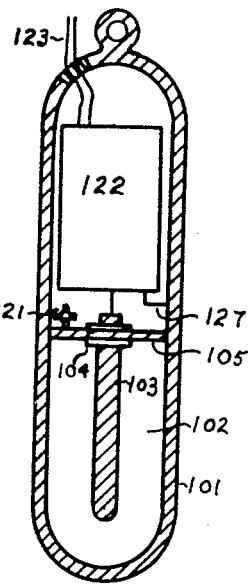
Figure 15 shows another type of apparatus for measuring radioactivity at various depths and giving an immediate indication at the surface of the ground of the value of the radioactive intensity.

The apparatus shown in Figure 15 is the same as that shown in Figure 14, except for the means of indicating the ionization current. In this modification, the information is transmitted to the surface through wires 123, allowing immediate observation at the surface, as well as recording. The central electrode 103 of the ionization chamber is connected to element 122 which represents schematically the electrical apparatus more fully shown hereinafter. A lead 127 is connected to metallic casing 101 serving to ground certain of the elements employed in the apparatus 122. Leads 123 extend to the surface of the ground, where they may pass over a wheel such as 13, onto a reel such as 14 provided with slip rings such as 14a and 14b. Connecting wires such as 16 and 18 serve to connect to frequency measuring apparatus, substituted for element 19 shown in Figure 4.

Figure 18:
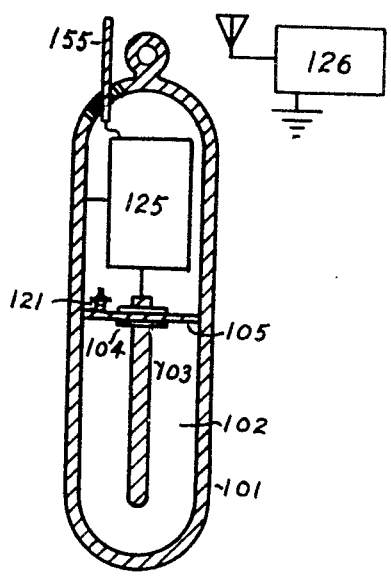
Figure 18 shows still another apparatus for measuring radioactivity, which apparatus employs radio transmission conveying information to the surface of the ground.
Figure 29:
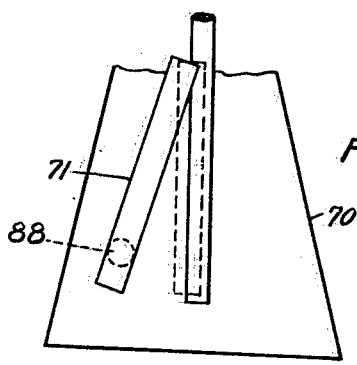
Figure 29 shows a side view of the electroscope and ionization chamber shown in Figure 10.

Figure 18 shows an apparatus similar to that shown in Figure 15, the principal difference being that an element 125 is used instead of element 122, serving to generate radio signals, which signals pass to the surface of the earth where they are detected and their frequency measured. The receiving apparatus is shown schematically as 126 and will be of a type familiar to those versed in the art. This operates on a frequency measuring apparatus which may also record the frequency. If a reel such as 13 is used to lower the apparatus, the depth at any moment can be told and correlated with the indicated frequency.

Referring now to Figure 19, 101 and 103 represent the elements of the ionization chamber. The side 101 is grounded, while the electrode 103 is connected to one terminal of a high resistance 128. The other terminal of resistance 128 is connected to the positive end of a high voltage battery 129, the negative end of this battery being grounded. A potentiometer 130 is connected across the terminals of battery 129, with its movable contact 153 connected to the cathode of a triode vacuum tube 131. A lead joins electrode 103 and the grid of a pentode vacuum tube 132. While a pentode is shown in the specific embodiment disclosed, any multielement tube having three or more elements, and having the proper characteristics, may be used.

A conventional battery 133 is shown to provide the heater current for the tubes. A "B" battery 134 is shown connected to battery 133 and leading to choke 135, the other terminal of the choke being connected to the plate of tube 132. A tap is taken off battery 134 to provide the screen grid voltage for tube 132. The plate of tube 132 is connected through condenser 136 to inductance 137. Inductance 137 terminates at terminal point 138 to which is connected one end of resistor 139. The other end of resistor 139 is connected to contact 153 as shown.

Across inductance 137 and resistance 139 is placed a condenser 140. The common terminal point 138 is connected to a grid of vacuum tube 132. While connection to a specific grid has been indicated, it is also possible to connect a lead from terminal 138 to the cathode of tube 132 or to any other element except the plate of the same tube, with satisfactory results. It will be understood that proper biasing means will be utilized for the specific type of tube chosen.

The cathode of tube 132 is connected through a conventional self-biasing arrangement 170 to the contact 153. The grid of tube 131 is connected through a conventional self-biasing arrangement 141 to inductance 137. The plate of tube 131 is connected to the primary of a coupling transformer 142, the other end of the primary being connected to the "B" battery as shown. The secondary of coupling transformer 142 may be connected to leads which are brought directly to the surface of the borehole and which are connected to a suitable frequency or other measuring device, such as 19. A suitable frequency can be chosen, high enough to be easily measurable, and low enough to avoid difficulties due to capacity and inductance effects along the transmitting cable.

The coupling transformer may be connected to an amplifier such as 154, the amplifier feeding into the external cable as shown. The amplifier will be found particularly valuable in preventing external load variations from reacting on the principal circuit and thus causing a disturbing change of frequency. Alternatively, the amplifier may feed directly into an antenna and ground arrangement, or into what is equivalent, a dipole radiating system of a type common to those versed in the radio art. This modification is shown schematically in Figure 20, 155 being the antenna or its equivalent and 156 being the ground or its equivalent. It will be understood that for this modification, a suitable radio frequency will preferably be employed.

As a still further alternative, the amplifier 154 may feed into an electromagnetic vibrator or sounding device, having an electromagnet 157 and an armature or diaphragm 158. The alternating current output of the amplifier 154 will serve to cause an alternating magnetic field of equivalent frequency in electromagnet 157, which will cause the mechanical vibration of armature 158. If this armature is made to vibrate with sufficient amplitude, the mechanical vibrations caused thereby may be made strong enough to allow their transmission to the surface of the earth where they can be detected by a detector device such as a microphone 159, amplified by amplifier 160, and their frequency measured by frequency measuring device 161. It will be understood that the constants in the circuit shown in Figure 19 will be chosen in the case aforementioned so as to give a frequency approximately within the audio-frequency range. The frequency may be made quite low, even below the audible frequency. This may be done either by selection of the proper constants of the circuit shown in Figure 19, or by the use of a "scaling" or subharmonic frequency device, incorporated with amplifier 154. The frequency may be made so low that a system similar to that indicated by the elements 50, 51, 52, 53, 54, and 55, in Figure 8 may be used in place of element 161.

While Figure 19 discloses an apparatus for generating a frequency in proportion to the intensity of radioactivity, it will be understood that an apparatus utilizing phase shift or amplitude variation as a function of radioactive intensity, may be used instead of one employing frequency variation.

An amplifying stage 162 may be inserted in the lead from element 103 of the ionization chamber to the grid of tube 132. This will be a direct current amplifier, and will serve to increase the voltage change on the grid for a given change in potential on element 103. Where the change in potential on element 103 is sufficient to cause a proper voltage change of the grid, the amplifier 162 may be omitted, and a direct connection made between the lead 103 and the grid element.

The operation of the circuit may be described as follows:

The elements 137, 139, and 140, together with tube 131, biasing arrangement 141, and the proper "A" and "B" voltage supplies, constitute an oscillatory circuit whose natural frequency is dependent on the values of inductance 137, condenser 140, and resistance 139.

There will be an alternating voltage across the terminals of resistance 139, which voltage will be in phase with the current flowing through the resistor. This voltage will be impressed between the cathode and one grid of tube 132, and will cause in general an alternating voltage of the same frequency between the grid and plate of tube 132. The voltage across resistor 139 is 90° out of phase with that across 137. Consequently, the voltage impressed by vacuum tube 132 across inductance 137 will also be 90° out of phase with the voltage in inductance 137. The magnitude of this voltage will be dependent upon the amplification due to tube 132. Any out-of-phase voltage across inductance 137 will have the effect of changing the apparent value of the inductance and will thereby cause a change in the frequency generated by the oscillatory circuit.

Any increase in radioactive intensity will alter the effective resistance between the electrodes 101 and 103. Through the agency of battery 129, an increased current will flow through the circuit composed of battery 129, resistance 128, and electrodes 101 and 103. This increased current will cause a greater voltage drop between terminals of resistance 128, which increased voltage drop, after amplification by amplifier 162, will be impressed across the cathode and a grid of tube 132. If the screen grid voltage has been properly adjusted, any change in the potential of the grid connected to amplifier 162, will cause a change in the effective amplification factor of tube 132. This change, as described previously will cause a change in the out-of-phase voltage impressed across inductance 137 and will thereby cause a change in the natural frequency of the oscillatory circuit described herein. The alternating current flowing through inductance 137 will induce voltages of equal frequency in transformer 142 and consequently in amplifier 154.

It is therefore seen that an alteration of radioactive intensity will cause a related and functionally connected change in frequency in the output of amplifier 163.

As in the modification shown in Figure 14, the voltage of battery 129 should be so chosen as to obtain the maximum ionizing effect without actual breakdown, and the value of resistance 128 should be of such value as to cause a significant voltage change across the cathode and grid of tube 132. The values of the constants in the remainder of the circuit should be chosen so that with the voltage changes normally obtained across the cathode and grid of tube 132, a sufficient change in frequency will be obtained in the output.

While a variety of vacuum tubes may be used for elements 131 and 132, a suitable set will be had by using an RCA type #957 tube as element 131 and an RCA type #959 tube as element 132. Suitable values for the other elements are as follows:

| | |
|---|---|
| 129 | 135 volts |
| 134 | 135 volts |
| 128 | 10 megohms |
| 170 | 1800 ohms and .01 mf. |
| 136 | .002 mf. |
| 137 | 700 microhenrys |
| 140 | 20 mmf. |
| 141 | 50,000 ohms and .0005 mf. |
| 139 | 100 ohms |

As described herein, the frequency may vary over a wide range, depending upon the particular mode of transmission of information to the surface. A suitable frequency is one megacycle.

Figure 22 shows still another modification making use of alternating currents only across the electrodes 101 and 103 of the ionization chamber. 143 represents the inductance of the plate resonant circuit of a standard vacuum tube oscillator. The mode of construction of such an oscillator will be well understood by those versed in the art and no further explanation thereof need be given here. Inductance 144 constitutes an element which is inductively coupled to element 143. One terminal of inductance 144 is connected to electrode 103, while the other terminal is connected to the terminal 101 of the ionization chamber. The elements of the circuit should be so proportioned that the maximum voltage developed across elements 101 and 103 will be of the proper value for the particular mode of construction and particular pressure utilized in the ionization chamber. The circuit constants are further chosen so as to give the desired frequency, which may be any usual audio or radio frequency. Any change in the conductivity of the gas between elements 101 and 103 will cause an altered current to flow in inductance 144. This will have the effect of altering the natural frequency of the system composed of the plate resonant circuit and the inductively coupled element 144. This frequency may be transmitted to any other inductively coupled element 145, which element will serve the function of the secondary of transformer 142.

Suitable values employed in the above modification are a voltage of between 100 and 150 volts across the elements of the ionization chamber, and a natural frequency in the vicinity of two megacycles in the oscillatory circuit.

Another system which may be employed is shown in Figure 23. Here element 143 is an inductive element in the plate resonant circuit of a conventional vacuum tube oscillator. Across the terminals of this inductance are connected condenser 146 and resistance 147 in series. Across the terminals of condenser 146 are connected the elements 103 and 101. Any change in the current flowing between electrodes 101 and 103 will cause an alteration in the effective natural frequency of the system composed of the elements shown. This change may be detected in an additional inductively coupled element 145, which again may be connected in place of the secondary of transformer 142.

Still another modification may be utilized for obtaining a frequency change in radio activity in the vicinity of elements 101 and 103. This is shown in Figure 24. Here high voltage battery 148 is connected with its positive end to element 103 of the ionization chamber. Element 101 is connected to one terminal of condenser 149, the other terminal being connected to one end of the primary 151 of a transformer. The other terminal of the primary 151 is connected to a glow discharge lamp 150, the other terminal of the discharge lamp being connected to element 101.

In operation a current will flow between electrodes 101 and 103 depending upon the ionizing effect of rays in the vicinity thereof. This current will serve to charge condenser 149 at a rate dependent upon the relation between the capacity of condenser 149 and the effective impedance of the gas between elements 101 and 103. As soon as the potential difference across the terminals of condenser 149 reaches the ignition voltage of glow lamp 150, a discharge will take place in the glow lamp and the voltage across condenser 149 will drop to the extinguishing voltage of glow lamp 150. Thereupon, the charging of condenser 149 will again commence and will proceed until the voltage reaches the ignition voltage of glow lamp 150 at which time the cycle will be repeated as before. The oscillations in the circuit including the primary of transformer 151 will be transferred inductively to secondary 152 from which it can be transmitted to the surface of the ground or used in other ways to signal in the same manner as shown for the secondary of transformer 142.

A further modification making use of a glow discharge lamp is shown in Figure 25. Here element 103 is connected to the positive end of a high voltage battery 129, the negative end of the battery being connected to the primary 151 of a transformer. The other end of the primary is connected to one terminal of a glow discharge lamp 150, the other terminal of the glow discharge lamp being connected to terminal 101. Across the terminals 101 and 103 is placed a condenser 149.

The operation of this circuit is analogous to that of the modification shown in Figure 24, the difference in impedance of the ionization chamber causing a different frequency of discharge of the glow discharge lamp. The pulses thus generated are transmitted to the secondary 152 as before.

It will be understood that if a glow lamp is used as the discharge device it will flicker at a rate dependent upon the radioactive intensity in the vicinity of the ionization chamber. The rate of flicker may be observed visually if the glow lamp is at an accessible locality. The rate of flicker may also be observed indirectly by photographic means. Thus the glow lamp may be substituted for the apparatus shown as 110 in Figure 17, and may be allowed to record on the photographic film 113. A series of streaks will be obtained on the photographic film, the number of streaks per unit length of film being directly related to the radio-active intensity. The glow lamp may further be allowed to act upon a photocell, thereby generating a frequency in the photocell circuit directly related to the frequency of the flashes. Where the photocell has an integrating action with respect to time, the intensity of current flowing in the photocell will be directly related to the frequency of discharge of the glow lamp.

It is further to be noted that a glow lamp may be substituted for element 142 in the circuit embodiment shown in Figure 19. The frequency of discharge of the glow lamp will then be a measure of the frequency generated in the associated circuit and will therefore be a measurement of the radioactive intensity in the vicinity of the ionization chamber. The glow lamp in this case also may be caused to act upon a photographic device or photocell as described above.

Though a glow discharge lamp has been mentioned as a proper circuit element in the modifications shown in Figures 24 and 25, it will be appreciated that in its place may be substituted another element having non-linear negative resistance characteristics.

Figure 26 shows an apparatus which may be utilized to measure what may be termed as the radioactive gradient along the length of a borehole. This apparatus is comprised of elements such as shown in Figure 16 in duplicate, and mounted at a substantial axial distance from each other. Each unit is connected to its associated measuring circuit 122, the outputs of the two circuits being each connected to separate frequency measuring systems at the surface of the ground. The two frequency measuring systems may be interconnected so as to superpose one frequency on the other and give the difference of the two frequencies as a result. In this way a measure will be obtained of the relative radio-activity of the rock materials at the respective levels of each of the ionization chambers. Thus the gradient or rate of change of radioactivity may be detected.

This modification will permit further distinguishing the actual radioactivities of the strata from the possible individual erratic behavior of each of the measuring elements.

If the latter feature is sought rather than the acual measurement of gradient of radioactivity, the measuring elements may be placed close together and their combined effect noted.

This modification is shown in Figure 27.

Figure 28 shows a modification of the apparatus shown in Figure 14, suitable for measurement of radioactive intensity through a filter. It will be understood that in certain areas little contrast will be noted in radioactive intensity throughout the length of the borehole. Advantage may be taken of the fact that different radioactive materials emit rays having different distributions of intensity in the radioactive spectrum. Thus, if a layer in the borehole is contaminated with thorium, the total intensity recorded on the apparatus may be the same as that for a layer contaminated wtih radium. However, if measurements be taken with a filter, the intensity due to radium will appear greater than that due to thorium, and the difference may be noted. The filter may also be found particularly valuable in cases where radioactive material is used as an indicator, as will be hereinafter described. Different materials may be introduced in the borehole, each having different radioactive properties. They may later be identified by measurements taken with a filter.

The apparatus shown in Figure 28 resembles that shown in Figure 14, except that an outer cylindrical shield or filter 164 has been placed completely surrounding the cartridge 101. A latch 165 is held by a spring in an indentation 166 in the filter. This latch may be operated by a solenoid 167 actuated by wires 168 which pass to the surface of the borehole. On passing an energizing current through wires 168, solenoid 167 will cause latch 165 to be withdrawn from indentation 168, allowing filter 164 to drop till it strikes the circumferential stop 169.

With filter 164 in the raised position, the apparatus will operate as previously described. The only filtering action will be that of the cartridge, and which is intrinsic in the material used. If it is desired to take the measurement with a filter, the energizing current can be applied while the apparatus is in the borehole, which will cause the filter to assume an operative position, after which a further measurement can be taken. With the filter 164 against stop 169 all rays entering the ionization chamber radially will have to pass through the filter. Since most of the rays enter the chamber in this way, the equivalent of a nearly complete filter will be obtained.

The filter may be made of any metal or substance having the desired absorbing properties. Examples of suitable materials are copper, lead, aluminum, etc. It is understood that the filter may be incorporated with the cartridge 101, and be made permanent, in which case only the filtered rays will impinge on the instrument.

There will be a special advantage in the utilization of the filter about one of the units shown in Figure 26 or 27. Here a differential result will be obtained, giving to the observer the difference between the filtered and unfiltered rays. Alternatively, filters may be used about both of the elements shown in Figures 26 and 27, a different filter being used about each element. By successive runs, with different pairs of filters, the data collected will be of greater value than that obtained by the mere measurement of unfiltered radiation.

The apparatus shown in Figure 5 particularly, may be made extremely sensitive to the rays emitted by radioactive substances and so the sometimes faint radioactivity of petroleum, natural gas and ground water detected. As has been pointed out previously, this may be done in spite of any covering of mud or of metallic casing intervening between the walls of the borehole and the cartridge 11. It is in fact, possible to run the cartridge 11 inside of the standard drill pipe used in rotary drilling and thus make measurements with a minimum of disturbance to drilling. Because of the limited absorptive power of the metals customarily used for drilling, it will be possible to detect radioactive rays through the thickness of metal in the drill pipe, or even through the several inch thickness of the drilling tools.

While, from what has been disclosed above, it is evident that strata may be differentiated from each other by means of the quantitative difference in the amount of associated radioactive material, it will be appreciated that strata need not necessarily be widely different in their associated radioactivity to enable one to differentiate them from one another. In cases where the associated radioactivities are not conspicuously different in conducting measurements from one end of the borehole to the other, valuable information may still be obtained by considering the manner in which the radioactivity varies, or phrased differently, the function by which radioactive intensity changes as the depth is altered. This will be found particularly valuable in searching for oil deposits. It will be recalled that petroleum deposits in the natural state have water associated with them. In many cases the water underlies the petroleum, and will have a radioactivity markedly different from that of the petroleum itself. Thus if an apparatus as described above, were lowered past a formation, a sudden change would be observed in passing from rock to petroleum, another sudden change in passing from petroleum to water, and still another sudden change in passing from water to rock. The layers might thus be easily identifiable despite the fact that their radioactivity may be no greater or less than that of most of the rock lining the borehole.

In certain localities, petroleum in particular may be found to have a limited radioactivity; so limited that detecting its presence with the apparatus shown becomes difficult. In these cases advantage may be taken of the superior absorptive power of petroleum for radium emanation gas. Radium emanation gas may be introduced at the surface of the borehole, being pumped into it so as to reach the lowest level. The borehole may then be cleaned out with a suitable fluid, such as water, and a test made for radioactivity in the manner described previously. It will be seen that if any petroleum exists in the borehole, it will absorb radium emanation gas in greater proportion than the other strata, and will therefore exhibit a stronger radioactivity.

Figure 12 shows an arrangement for performing the above operation. Here a gas container is shown schematically as 91. This contains the radium emanation gas (sometimes known as "radon"). A pump shown schematically as 92 serves to draw the gas from the tank 91 and pump it down through conduit 93. The gas emerges at the opening 94 of the conduit 93. A layer having superior absorptive properties for radon gas, such as an oil bearing layer, will absorb the gas more rapidly than the other layers. Such an absorbing layer is shown as R. In this instance the borehole is shown as being full of fluid through which the gas is bubbled.

While radon gas has been mentioned as a suitable material, it will be appreciated that other substances having radioactive properties may be used instead. Such other substances may be radioactive salts, either those having a natural radioactivity or those having an artificially excited radioactivity. It is only necessary for the purpose of the invention that the substance used be selectively absorbed by the layer of interest within the borehole.

It will further be appreciated that in some cases the lack of absorption of the radioactive materials by a layer will serve to identify the layer. In still other cases, the absorption, due to a layer, may be so great, that the area in the region of the layer will be denuded of radioactive material, and will appear less radioactive than the area in which the absorption is less. In all cases, however, the differences between layers will be identifiable by the differences in residual radioactivity.

It is obvious that any other means than those shown or described may be used to convey the frequency of the impulses produced by the apparatus in Figure 5 or in Figure 10, to the surface.

The elements employed in the member 11 may be combined with a perforating tool as ordinarily used for perforating casing in oil, gas or water wells. With this it will be possible to lower the apparatus slowly until an indication of radioactivity is received. The apparatus may then be stopped and the perforating procedure carried on as usual. This will have the advantage of eliminating the inaccuracy usually made in measurement. Heretofore, it has been the custom to measure the depth to the level in question, then run the perforator to that depth. This involved two measurements, the combined error of which was at times sufficient to cause perforation to be performed at the wrong level. The method described above can have none of these errors, since it is not dependent in any way on a measurement of depth.

Figure 13:
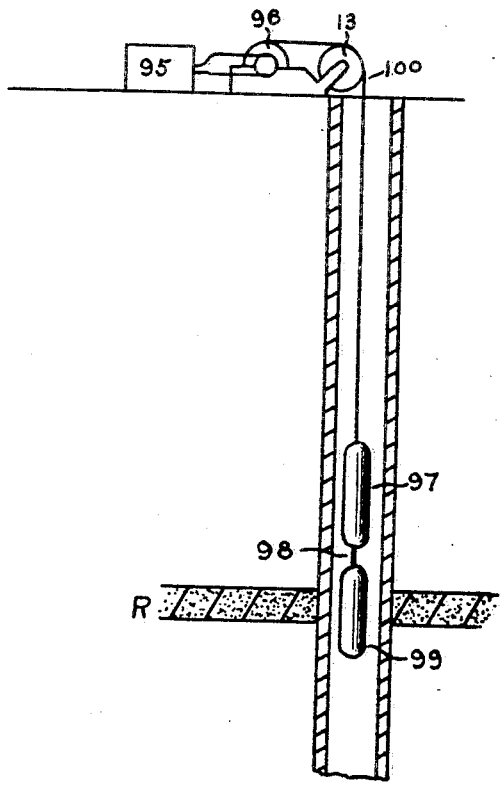
Figure 13 shows a modification of the apparatus designed to permit perforation of the casing in a well.

A schematic showing of this appears in Figure 13. Here an apparatus capable of measuring radioactivity is shown schematically as 97. This is connected to a perforating element 99. This latter arrangement may be of any of the well known types. However, the type known as a "gun perforator," which perforates the casing by firing bullets through the casing, will be found particularly suitable. The assemblage made up of radioactive apparatus 97, connector 98 and perforating element 99 may be raised and lowered by means of cable 100. This cable will serve both for raising and lowering and for operating the apparatus and making observations. The cable passes over wheel 13, onto reel 96. Connection is made between the reel and apparatus 95. Apparatus 95 serves to make observations and to control the elements that are being raised and lowered.

In cases in which the apparatus shown in Figure 18 is used, it will be understood that measurements in a dry borehole will ordinarily be contemplated. In order to make this technique most effective, it will be preferable to employ a radio wave of wave length comparable with the diameter of the borehole. With such a wave length, the borehole will act as a type of tube guiding the radio waves to the top of the hole. Such a modification will operate even though the borehole be filled, or partially filled, with liquid.

In application Serial No. 137,380, filed April 16, 1937, entitled Method and apparatus for measuring radioactivity, there is particularly described and claimed methods and apparatus for quantitatively measuring radioactive properties of formations encountered at different depths inside of drill holes and determining the variation of the said properties with the depth of the drill hole. In application Serial No 301,078, filed October 24, 1939, entitled Method and apparatus for measuring radioactivity, there is particularly described and claimed apparatus and methods for measuring radioactivity in deep narrow boreholes including an oscillatory circuit to generate oscillations, the oscillations generated being dependent upon the intensity of radioactivity and measurement of frequencies generated as a measure of radioactive properties in the borehole. The instant application is a division of said application Serial No. 301,078. In application Serial No. 415,826, filed October 20, 1941, entitled Radioactive well logging method and apparatus, now Patent No. 2,384,840, there is particularly described and claimed apparatus and methods in which a detector such as an ionization chamber generates a current whose value is dependent upon the intensity of radioactivity in a drill hole and the generation of a series of impulses thereby, the impulses being determined in accordance with the radioactivity together with transmission of the impulses and their determination at the surface. In application Serial No. 422,450, filed December 10, 1941, entitled Method and apparatus for direct recording of borehole radioactivity, now Patent No. 2,409,436, there is particularly described and claimed apparatus and methods for measuring radioactivity in which the radioactive rays impinging on the detector element are modified by a filter, also continuous members sensitive to radioactivity are utilized in detecting the radioactivity. In application Serial No. 433,212, filed March 3, 1942, entitled Radiant energy activation, there is particularly described and claimed the introduction of radioactive material into a borehole to be selectively absorbed therein and determination of the radioactivity after such introduction. In application Serial No. 452,228, filed July 24, 1942, entitled Multiple element radioactive ray recording, there is particularly described and claimed the measurement of radioactivity particularly in geological formations in which several measurements are made, one with the interposition of a filter element and the other without or where two sets of measurements are made under different conditions insofar as ray penetration is concerned.

The scope of the invention is defined by the appended claims:

1. In an apparatus for the measurement of radioactivity in a deep narrow borehole, a holder of narrow lateral dimensions capable of fitting into the borehole and capable of being lowered to various depths therein, the said holder including a detector sensitive to rays from radioactive substances to produce responses thereto, and amplifying means to amplify said responses, a cable leading from the holder to the surface of the earth, a source of electrical energy connected to the said cable at the surface of the earth to provide the energy for transmitting signals up the cable, means carried by the said holder operated by the said amplifying means and controlling the energy conducted from the surface of the earth in such manner as to create within the cable a pulsating signal having a property determined by the said rays, and means at the surface of the earth for receiving and recording the pulsating signal transmitted by the said cable.

2. In an apparatus for the measurement of radioactivity in a deep narrow borehole, a holder containing a detector sensitive to radioactive rays, means to charge the elements of the said detector to a high potential relative to each other so as to obtain a response indicative of the radioactivity within the borehole, means associated with the said detector to supply a signal whose properties are indicative of the transfer of charge within the detector, a cable connected to the last named means to transmit the said signal to the surface of the earth, a source of electrical energy connected to the said cable at the surface of the earth the electrical energy from the said source being controlled by the signal supplying means to create the signal within the said cable.

3. In an apparatus for the measurement of radioactivity in a deep narrow borehole, a holder of narrow lateral dimensions capable of fitting into the borehole and capable of being lowered to various depths therein, the said holder including a Geiger-Muller detector sensitive to rays from radioactive substances to produce responses thereto, amplifying means to amplify said responses, a cable leading from the holder to the surface of the earth, a source of electrical energy connected to the said cable at the surface of the earth to provide the energy for transmitting signals up the cable, means carried by the said holder to create a pulsating signal in the said cable dependent on said responses and means at the surface of the earth for receiving and recording the pulsating signal transmitted by the said cable.

4. In an apparatus for the measurement of rays from radioactive substances, means to create a varying electric current having a predetermined repetitive nature, including means sensitive to the radiations from radioactive substances, the sensitive means being adapted to correlate a characteristic of the said varying current with the intensity of radioactivity, means to transmit the said varying current to a distant point, and means to receive and record the said varying current at a distant point so that the radioactive strength in the vicinity of the sensitive member may be determined at the distant point.

5. In an apparatus for the measurement of radioactivity within a deep narrow borehole, a narrow holder capable of being lowered within the borehole and containing a detector sensitive to radioactivity and auxiliary apparatus to amplify the responses of said detector, a cable serving to raise and lower the said holder and to provide electrical communication between the said holder and apparatus at the surface of the earth, means at the surface of the earth to supply direct current energy through the intermediacy of the cable to the holder to provide the energy for transmitting signals up the cable, means within the holder operated by the said auxiliary apparatus to control the energy conducted to the holder by the said cable in intermittent manner to create pulses indicative of radioactivity for transmission up the said cable to the surface of the earth and means at the surface of the earth for receiving and recording the pulses indicative of radioactivity.

6. In an apparatus for the measurement of radioactivity in a deep narrow borehole, a holder of narrow lateral dimensions capable of fitting into the borehole and capable of being lowered to various depths therein, the said holder including a detector sensitive to rays from radioactive substances to produce responses thereto and amplifying means to amplify said responses, a cable leading from the holder to the surface of the earth, signalling means to transmit a pulsating signal dependent upon the amplified responses up the cable, a direct current source of electrical energy connected to the said cable at the surface of the earth to provide the energy for transmitting signals up the cable, and means at the surface of the earth for receiving and recording the pulsating signal.

7. In an apparatus for the measurement of radioactivity in a deep narrow borehole, a holder containing a detector sensitive to radioactive rays, means to charge the elements of the detector to a high potential relative to each other so as to obtain a response indicative of the radioactivity within the borehole, means associated with the said detector to supply a signal whose properties are indicative of the transfer of charge within the detector, a cable connected to the last named means to transmit the said signal to the surface of the earth, a direct current source of energy connected to said cable at the surface of the earth the electrical energy thereby conducted by the cable to the holder being controlled by the signal supplying means to establish the said signal in the cable.

8. In an apparatus for the measurement of radioactivity, means to create a varying electric current having a characteristic predetermined repetitive nature, including an ionization chamber having electrodes exposed to radioactive rays, a direct current source of electrical energy connected to the said chamber to charge the electrodes thereof, the frequency of repetition being dependent upon the transfer of charge in the said ionization chamber and transmitting means connected to the said generator to transmit to a distant point an electrical signal indicative of the frequency of repetition and therefore of the radioactivity in the vicinity of the said chamber.

9. In an apparatus for the measurement of radioactivity in a deep narrow borehole, a holder having narrow lateral dimensions capable of being inserted within the borehole, an ionization chamber mounted upon the holder, the current flow in said chamber being dependent upon the radioactivity proximate thereto, means to create an electrical signal mounted upon the holder including the said ionization chamber and adapted to generate electrical pulses whose characteristics are determined by and related to the transfer of charge in the ionization chamber, means to transmit the pulses to the surface of the earth, means at the surface of the earth to receive and record the pulses so as to furnish at the surface of the earth a record of the radioactivity at various depths within the borehole.

10. In an apparatus for the measurement of radioactivity within a deep narrow borehole, a holder having narrow lateral dimensions capable of fitting within the borehole and being lowered to various depths therein, an ionization chamber having electrodes mounted upon the said holder, means to impress a direct current voltage across the electrodes of the ionization chamber so that the current flow therethrough will be proportional to the radioactive intensity in the vicinity of the ionization chamber, means including the said ionization chamber mounted upon the holder to generate electrical pulses having a characteristic determined by and related to the transfer of charge between the electrodes of the said ionization chamber, means to transmit the pulses to the surface of the earth, and means to receive and record the pulses at the surface of the earth thereby furnishing at the surface of the earth a record of radioactivity at different depths within the borehole.

11. In an apparatus for the measurement of radioactivity in a deep narrow borehole, a holder of narrow lateral dimensions capable of fitting into the borehole and capable of being lowered to various depths therein, the said holder including a detector sensitive to rays from radioactive substances to produce responses thereto and amplifying means to amplify said responses, a two-conductor type cable leading from the holder to the surface of the earth, a source of electrical energy connected to the said cable at the surface of the earth electrical energy being conducted downward into said holder by the cable, means carried by the said holder to control the said electrical energy conducted thereto to form a pulsating signal within the said cable dependent on said responses, and means at the surface of the earth for receiving and recording the pulsating signal transmitted by the said cable.

12. In an apparatus for the measurement of radioactivity in a deep narrow borehole, a holder of narrow lateral dimensions capable of fitting into the borehole and capable of being lowered to various depths therein, the said holder including a detector sensitive to rays from radioactive substances to produce responses thereto, and amplifying means to amplify said responses, a cable leading from the holder to the surface of the earth controlling means connected to the amplifying means and to the said cable to control current conducted to said controlling means by the said cable in accordance with the amplified responses, the terminals of the cable at the surface of the earth being connected to slip rings, brushes bearing respectively on said slip rings, the said brushes being connected in series with a battery and a recorder, whereby the recorder is actuated by virtue of the connection to the battery, the said cable, and the said controlling means.

13. In an apparatus for the measurement of radioactivity, a system comprising an ionization chamber having substantially spherical inner and outer electrodes, having associated therewith an electroscope, a battery to charge the elements of the chamber, a lamp and photocell being arranged on either side of the said electroscope whereby the said electroscope will allow the beam from the lamp to pass or to be obscured depending on the state of the charge thereof, a relay connected to the said photocell to effect the charging of the ionization chamber elements periodically on its charge falling off by a definite amount, the electrodes of the said ionization chamber being exposed to radioactive rays, whereby a pulsating current whose frequency is a measure of the radioactivity in the vicinity of the said ionization chamber is produced.

14. The combination with an instrument adapted to be lowered by a conducting cable into a well bore for indicating conditions therein at different levels, the said instrument having an element therein producing an optically observable indication of the quantity to be measured, of means for correlating the record of said instrument in terms of well depth, comprising: an actuator incorporated in said instrument for causing a predetermined cycle of operation of said instrument after initiation of operation thereof; and apparatus at the well surface and electrically associated with said instrument through said conductor cable, including means for indicating initiation of a cycle of operation, means for controlling said actuator to cause repetition of said cycle of operation, and means for indicating the position of said instrument in the well bore.

15. The combination with an instrument adapted to be lowered by a conductor cable into a well bore for recording conditions therein at different levels, of means for correlating the record of said instrument in terms of well depth, comprising: an actuator incorporated in said instrument for causing a predetermined cycle of operation of said instrument after initiation of operation thereof; a recording device at the surface of the well bore for indicating movement of said cable; and means operatively connected with said instrument and recording device for indicating on said recording device initiation of each cycle of operation.

16. An apparatus for exploring variations in sub-atomic bombardment in a formation confronting a well bore comprising: a housing; a cable for lowering said housing into a well bore; a detector of sub-atomic bombardment within said housing; a recorder for said detector also contained within said housing and including a record strip adapted to advance as said recorder is operated means operated by the said detector to mark a record upon the record strip indicative of the sub-atomic bombardment sensed by the said detector, and means associated with the said recorder to move the record strip at a known and controlled rate, means to indicate the depth to which the apparatus has been lowered, whereby the record strip may be interpreted in terms of well depth.

SHELLEY KRASNOW.
LEON F. CURTISS.

REFERENCES CITED

The following references are of record in the file of this patent:

UNITED STATES PATENTS

| Number | Name | Date |
|---|---|---|
| 2,133,776 | Bender | Oct. 18, 1938 |
| 2,197,453 | Hassler | Apr. 16, 1940 |
| 2,219,273 | Scherbatskoy | Oct. 22, 1940 |
| 2,298,794 | Howell | Oct. 13, 1942 |
| 2,313,310 | Arnold | Mar. 9, 1943 |